(12) United States Patent
Ait Aoudia et al.

(10) Patent No.: US 11,894,960 B2
(45) Date of Patent: Feb. 6, 2024

(54) TRANSMITTING OF INFORMATION IN WIRELESS COMMUNICATION

(71) Applicant: NOKIA TECHNOLOGIES OY, Espoo (FI)

(72) Inventors: Faycal Ait Aoudia, Saint-Cloud (FR); Jakob Hoydis, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 112 days.

(21) Appl. No.: 17/700,710

(22) Filed: Mar. 22, 2022

(65) Prior Publication Data

US 2022/0303163 A1    Sep. 22, 2022

(30) Foreign Application Priority Data

Mar. 22, 2021    (FI) .................................. 20215318

(51) Int. Cl.
*H04L 27/01*    (2006.01)
*G06N 20/00*    (2019.01)
*H04L 27/26*    (2006.01)
*H04L 25/03*    (2006.01)

(52) U.S. Cl.
CPC .......... *H04L 27/01* (2013.01); *G06N 20/00* (2019.01); *H04L 27/26412* (2021.01); *H04L 25/03165* (2013.01)

(58) Field of Classification Search
CPC .............. H04L 27/01; H04L 27/26412; H04L 25/03165; G06N 20/00

USPC ........................................................ 375/340
See application file for complete search history.

(56) References Cited

U.S. PATENT DOCUMENTS

| | | | |
|---|---|---|---|
| 2006/0222107 A1 | 10/2006 | Neubauer et al. | |
| 2011/0189440 A1 | 8/2011 | Appleby et al. | |
| 2012/0134238 A1 | 5/2012 | Surprenant et al. | |
| 2020/0052810 A1* | 2/2020 | Shapin ................. | H04L 1/1832 |

FOREIGN PATENT DOCUMENTS

| | | |
|---|---|---|
| CN | 110113288 A | 8/2019 |
| CN | 110663203 A | 1/2020 |
| CN | 111492596 A | 8/2020 |
| CN | 112054977 A | 12/2020 |

OTHER PUBLICATIONS

Communication of Acceptance—section 29 a of Patents Decree dated Oct. 19, 2022 corresponding to Finnish Patent Application No. 20215318.

(Continued)

*Primary Examiner* — Leila Malek
(74) *Attorney, Agent, or Firm* — SQUIRE PATTON BOGGS (US) LLP

(57) ABSTRACT

A method comprising receiving a modulated radio signal transmitting coded information bits, performing demodulating on the modulated radio signal, wherein demodulating comprises performing orthogonal time frequency space demodulation, performing equalization on the demodulated radio signal to obtain equalized symbols, obtaining log-likelihood ratios for the coded information bits from the equalized symbols using a trained machine learning model, and reconstructing the coded information bits.

13 Claims, 7 Drawing Sheets

(56) References Cited

OTHER PUBLICATIONS

Extended Search Report dated Aug. 18, 2022, corresponding to European Patent Application No. 22158469.1.
Erturk M Cenk et al: "Potential Future Aviation Communication Technologies", 2019 IEEE/AIAA 38th Digital Avionics Systems Conference (DASC), IEEE, Sep. 8, 2019, pp. 1-10.
Zhu Banghua et al: "Joint Transceiver Optimization for Wireless Communication PHY Using Neural Network", IEEE Journal on Selected Areas in Communications, IEEE Service Center, Piscataway, US, vol. 37, No. 6, Jun. 1, 2019.
Office Action dated Oct. 4, 2021 corresponding to Finnish Patent Application No. 20215318.
Finnish Search Report dated Oct. 4, 2021 corresponding to Finnish Patent Application No. 20215318.
Xiaoke Xu et al., "A Damped GAMP Detection Algorithm for OTFS System based on Deep Learning," In: IEEE 92nd Vehicular Technology Conference (VTC2020—Fall), Nov. 18, 2020.
Weijie Yuan et al., "A Simple Variational Bayes Detector for Orthogonal Time Frequency Space (OTFS) Modulation," IEEE Transactions on Vehicular Technology, vol. 69, No. 7, Jul. 2020 (Apr. 30, 2020), pp. 7976-7980.
P. Raviteja et al., "Interference Cancellation and Iterative Detection for Orthogonal Time Frequency Space Modulation," IEEE Transactions on Wireless Communications, vol. 17, No. 10, Oct. 2018, pp. 6501-6515.
Ashwitha Naikoti et al., "Low-complexity Delay-Doppler Symbol DNN for OTFS Signal Detection," In: IEEE 93rd Vehicular Technology Conference (VTC2021—Spring), Apr. 25, 2021.
Yosef K. Enku et al., "Two-dimensional Convolutional Neural Network based Signal Detection for OTFS Systems," In: IEEE Wireless Communications Letters, Aug. 2021.
First Office Action dated Aug. 15, 2023 corresponding to Chinese Patent Application No. 202210279923.X, with English Summary thereof.

* cited by examiner

TRANSMITTING OF INFORMATION IN WIRELESS COMMUNICATION

FIELD

The following exemplary embodiments relate to wireless communication and transmitting information using modulation of radio signals.

BACKGROUND

Wireless networks provide communication services that enable devices to connect to each other and receive and transmit data. The information that is to be transmitted may be transmitted using radio waves that are modulated. Waveforms of the radio waves then indicate how the radio signals are modulated. Such modulation may be used to transmit information between device in wireless networks such as cellular wireless networks and WiFi.

BRIEF DESCRIPTION

The scope of protection sought for various embodiments is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising at least one processor, and at least one memory including a computer program code, wherein the at least one memory and the computer program code are configured, with the at least one processor, to cause the apparatus to receive a modulated radio signal transmitting coded information bits, perform demodulating on the modulated radio signal, wherein demodulating comprises performing orthogonal time frequency space demodulation, perform equalization on the demodulated radio signal to obtain equalized symbols, obtain log-likelihood ratios for the coded information bits from the equalized symbols using a trained machine learning model, and reconstruct the coded information bits.

According to a second aspect there is provided an apparatus comprising means for receiving a modulated radio signal transmitting coded information bits, performing demodulating on the modulated radio signal, wherein demodulating comprises performing orthogonal time frequency space demodulation, performing equalization on the demodulated radio signal to obtain equalized symbols, obtaining log-likelihood ratios for the coded information bits from the equalized symbols using a trained machine learning model, and reconstructing the coded information bits.

According to a third aspect there is provided a method comprising receiving a modulated radio signal transmitting coded information bits, performing demodulating on the modulated radio signal, wherein demodulating comprises performing orthogonal time frequency space demodulation, performing equalization on the demodulated radio signal to obtain equalized symbols, obtaining log-likelihood ratios for the coded information bits from the equalized symbols using a trained machine learning model, and reconstructing the coded information bits.

According to a fourth aspect there is provided a computer program comprising instructions for causing an apparatus to perform at least the following: receive a modulated radio signal transmitting coded information bits, perform demodulating on the modulated radio signal, wherein demodulating comprises performing orthogonal time frequency space demodulation, perform equalization on the demodulated radio signal to obtain equalized symbols, obtain log-likelihood ratios for the coded information bits from the equalized symbols using a trained machine learning model, and reconstruct the coded information bits.

According to a fifth aspect there is provided a computer program product comprising instructions for causing an apparatus to perform at least the following: receive a modulated radio signal transmitting coded information bits, perform demodulating on the modulated radio signal, wherein demodulating comprises performing orthogonal time frequency space demodulation, perform equalization on the demodulated radio signal to obtain equalized symbols, obtain log-likelihood ratios for the coded information bits from the equalized symbols using a trained machine learning model, and reconstruct the coded information bits.

According to a sixth aspect there is provided a computer program comprising instructions stored thereon for performing at least the following: receive a modulated radio signal transmitting coded information bits, perform demodulating on the modulated radio signal, wherein demodulating comprises performing orthogonal time frequency space demodulation, perform equalization on the demodulated radio signal to obtain equalized symbols, obtain log-likelihood ratios for the coded information bits from the equalized symbols using a trained machine learning model, and reconstruct the coded information bits.

According to a seventh aspect there is provided a non-transitory computer readable medium comprising program instructions for causing an apparatus to perform at least the following: receive a modulated radio signal transmitting coded information bits, perform demodulating on the modulated radio signal, wherein demodulating comprises performing orthogonal time frequency space demodulation, perform equalization on the demodulated radio signal to obtain equalized symbols, obtain log-likelihood ratios for the coded information bits from the equalized symbols using a trained machine learning model, and reconstruct the coded information bits.

According to an eight aspect there is provided non-transitory computer readable medium comprising program instructions stored thereon for performing at least the following: receive a modulated radio signal transmitting coded information bits, perform demodulating on the modulated radio signal, wherein demodulating comprises performing orthogonal time frequency space demodulation, perform equalization on the demodulated radio signal to obtain equalized symbols, obtain log-likelihood ratios for the coded information bits from the equalized symbols using a trained machine learning model, and reconstruct the coded information bits.

LIST OF DRAWINGS

In the following, the invention will be described in greater detail with reference to the embodiments and the accompanying drawings, in which FIG. 1 illustrates an exemplary embodiment of a radio access network.

DESCRIPTION OF EMBODIMENTS

Figure 1:
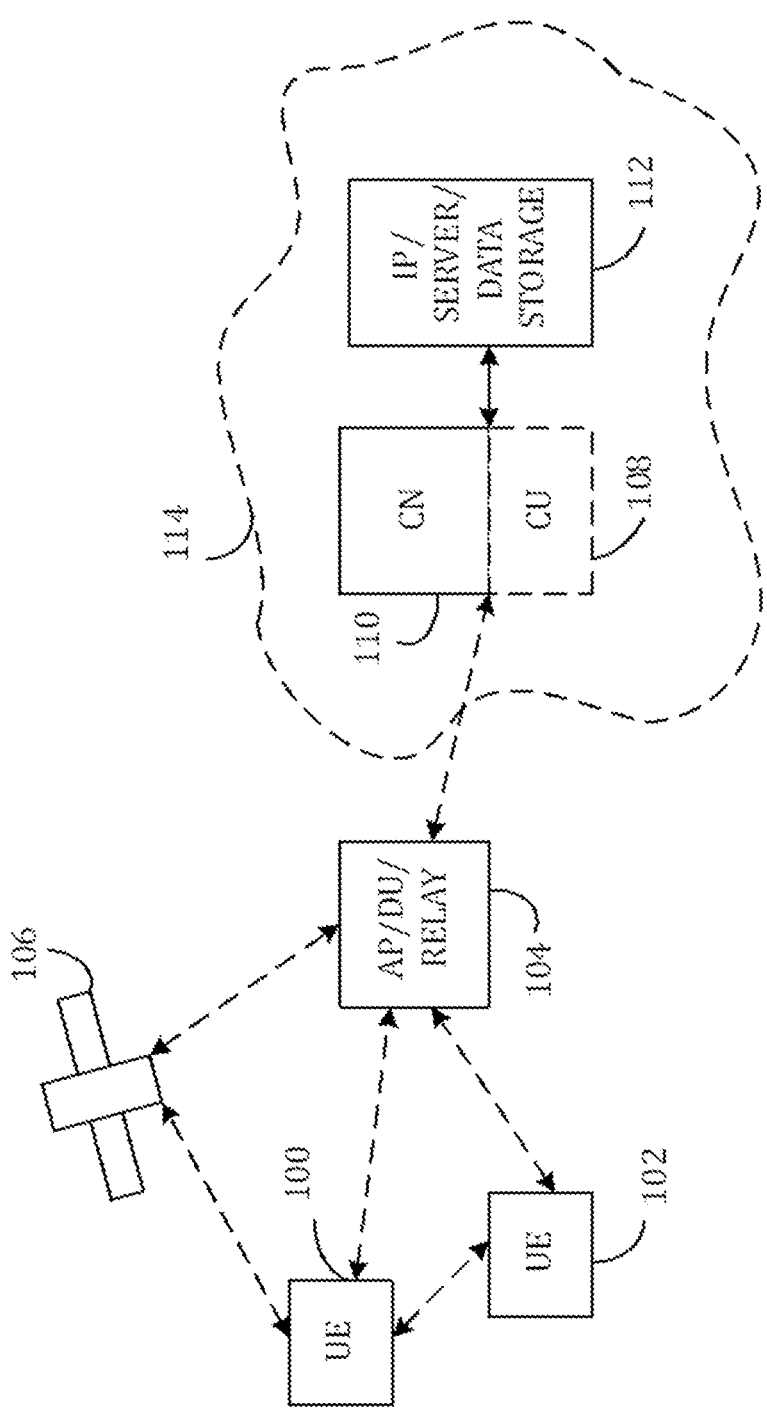

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

As used herein, the term "determining" (and grammatical variants thereof) may include, as a non-exhaustive listing, for example calculating, computing, processing, deriving, measuring, investigating, looking up (e.g., looking up in a table, a database or another data structure), ascertaining and the like. Also, "determining" may include receiving (e.g., receiving information), accessing (e.g., accessing data in a memory), obtaining and the like. Also, "determining" may include resolving, selecting, choosing, establishing, and the like.

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. A terminal device may also be a device having capability to operate in Internet of Things (IoT) network.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require to bring the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Satellite communication may utilise geostationary earth orbit (GEO) satellite systems, but also low earth orbit (LEO) satellite systems, for example, megaconstellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite or part of the gNB may be on a satellite, the DU for example, and part of the gNB may be on the ground, the CU for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc.

Wireless networks enable data to be transmitted between two devices that are capable of connecting to the wireless network. The wireless network may be a standardized network such as WiFi or a cellular communication network according to a 3GPP standard like 4G and 5G. The data to be transmitted may be transmitted using modulation of a radio signal and waveforms of the radio signal define how the radio signal was modulated to transmit the data. Waveforms may control the shape of the signal and most of its signal-processing features such as spectral and time containment, peak-to-average power ratio, PAPR, and spectral efficiency. An example of a waveform that may be used is orthogonal frequency-division multiplexing, OFDM, which allows data to be encoded on multiple carrier frequencies. Among the benefits achieved using OFDM is an ability to cope with severe channel conditions such as narrowband interference and frequency-selective fading due to multipath, without requiring complex equalization filters. Thus, modulation and demodulation of OFDM are of low complexity. OFDM also allows for single-tap equalization and facilitates multiplexing due to granular access to the time-frequency grid.

Another example of a waveform that could be used for transmitting data in a wireless network is orthogonal time frequency space, OTFS. OTFS is a modulation scheme in which a transmitted symbol experiences a near-constant channel gain also in channels at high carrier frequencies, such as mm-wave, or with high Doppler. OTFS may thus be considered to perform modulation in a delay-Doppler domain. Thus, an advantage of OTFS is that it may enable significant reduction of the bit error rates, BERs, in situations with high Doppler. OFDM on the other hand may be more sensitive to Doppler spread, which may lead to inter carrier interference, ICI. Also, OFDM may require a smaller cycling prefix, CP, than OFDM which requires the use of CP to mitigate inter symbol interference, ISI. This causes OTFS to obtain further gains in spectral efficiency. Yet, OTFS introduces interference between the transmitted symbols which may require higher complexity at a receiver, which may be a receiving unit comprising hardware and/or software and configured to receive the transmitted data. The receiving unit may be comprised in a device capable of connecting to the wireless network. For example, complex iterative detection schemes may be designed that rely, e.g., on interference cancellation or iterative demapping and decoding.

To achieve accurate reconstruction of transmitted bits, machine learning may be combined with linear pre-processing of a received signal that is used to transmit data. Machine learning models may be categorized broadly as supervised or unsupervised. Supervised models may apply what has been learned in the past using labelled examples to predict future events. A supervised algorithm may require a set of data known as training data, comprising input data and labels that are considered as the output values of machine learning algorithms. Starting from the analysis of the training data, the machine learning algorithm produces a model, such as a mathematical model, that makes predictions about the output values. After sufficient training, the model may provide accurate output values for any new input data. The accuracy of the model, that is, the adequacy of the training may be validated by techniques such as cross-validation method. When training, some part of the labelled training data is not used for training but saved for estimating the model accuracy, that is, if the model gives a correct label to an already known output value. An unsupervised algorithm in turn takes a set of data that comprises input data without labels and finds a structure in the input data, like grouping or clustering of data points. Therefore, unsupervised methods do not need a labelled input data for training in contrast to supervised methods but may learn from input data that has not been labelled.

Multiple supervised machine learning models exist and one example of a supervised machine learning model is an artificial neural network, ANN, which may also be referred to as a neural network, NN. An artificial neural network comprises connected neurons that loosely resemble neurons in a biological brain. The neurons are computing entities which, when connected, can form one or more layers. A connection between two neurons resembles a synapse in a biological brain. The selection of training data has a significant impact on how well the algorithm executed on the framework offered by the neural network learns to provide correct and reliable results as the algorithm learns to recognize patterns of the training data and thereby is able to recognize new data. As the learning is based on patterns, the better the patterns are extracted from the training data, the better the algorithm can learn. An example of a neural network is a convolutional neural network, CNN. A CNN comprises an input layer, one or more hidden layers and an output layer. In a convolutional neural network, the one or more hidden layers comprise layers that perform convolutions. For example, there may be a layer that does multiplication or other dot product, and its activation function may be a rectified linear unit, ReLU. This layer may be followed by other convolution layers such as pooling layers, fully connected layers and normalization layers.

Using a machine learning model such as a CNN together with linear pre-processing of the received signal, accurate reconstruction of the transmitted bits may be achieved, while taking advantage of the high efficiency of CNN hardware acceleration.

Figure 2A:
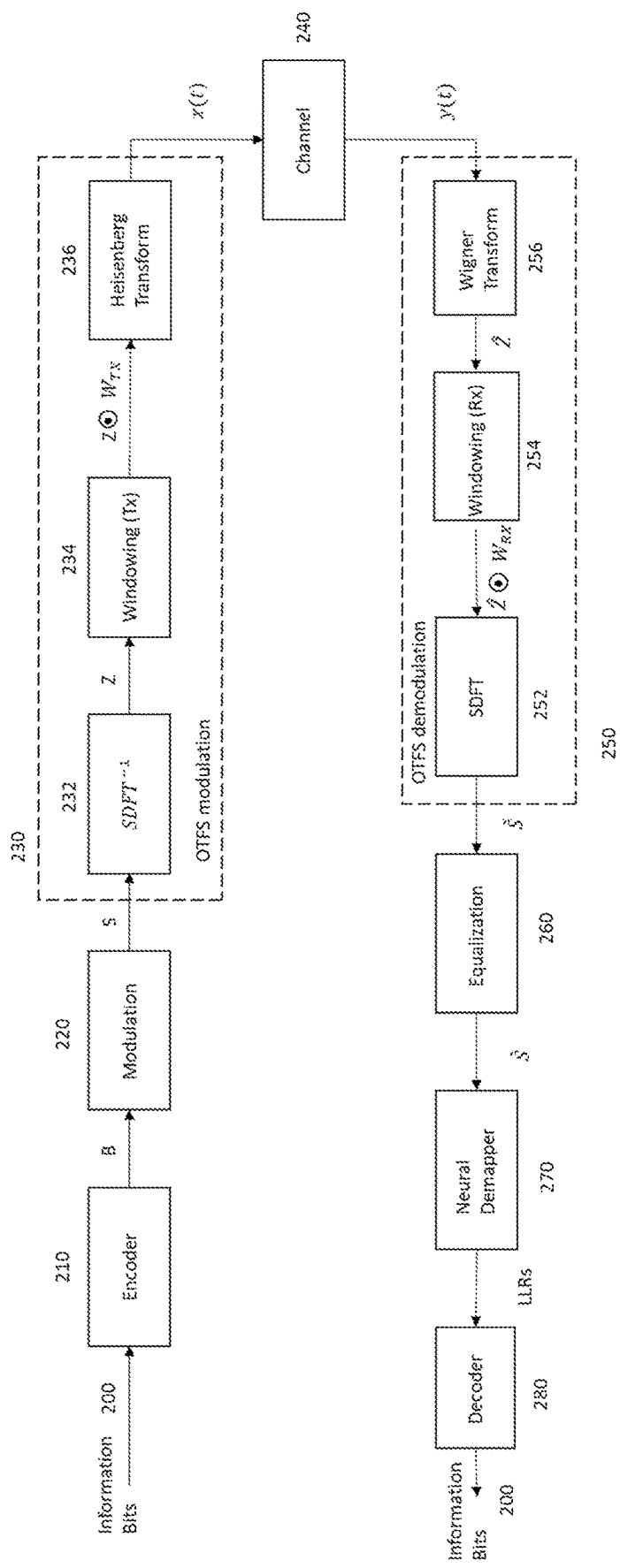
FIGS. 2A and 2B illustrate exemplary embodiments of a system comprising transmitting and receiving data using a radio signal.

For example, a receiving unit, such as described above, may comprise a demapper using a neural network that determines log-likelihood ratios, LLRs, for the coded bits, that were transmitted and received, from equalized received symbols. The computed LLRs may then be fed to a decoder which reconstructs the transmitted information bits. Pre-processing of the received signal by equalizing may enable lower BERs and reduce the required complexity of the NN implementing the demapper. The demapper may then be trained such that it approximates the optimal maximum aposteriori distribution. Additionally, transmitter windowing and/or receiver windowing filters may be optimized. Transmitter windowing and receiver windowing may be part of for example modulation and demodulation. Optimization of the transmitter windowing and/or receiver windowing may be performed jointly with the neural demapper in an end-to-end manner, as illustrated in FIG. 2A. Although transmitter windowing and receiver windowing are operations that are distinct from the demapper, the transmitter and receiver windowing may be trainable operations and may be trained together, in other words jointly, with training of the machine learning comprised in the demapper.

FIG. 2A illustrates an exemplary embodiment of a system that comprises transmitting and receiving of data using a radio signal. It is to be noted that the system illustrated is an end-to-end system and that the unit for receiving may be comprised in a device that is separate from another device that comprises a unit for transmitting. Yet, illustrating an exemplary embodiment of the system aids to understand how receiving may be improved. The system comprises units that may be logical units and their implementation may be achieved using any suitable implementation. In this exemplary embodiment there is data to be transmitted over a wireless network using a modulated radio signal. The data thus comprises information bits 200 that are coded by an encoder 210. The encoding may be done using for example a low-density parity-check code, LDPC. The coded bits may be denoted by $B \in \{0,1\}^{N \times M \times K}$, where N and M are the dimensions of a resource grid, RG, and K is the number of bits per resource element, RE.

After encoding, the coded bits B are modulated by a modulation unit 220. The modulation in this exemplary embodiment is performed using quadrature amplitude modulation, QAM, with Gray labelling. However, in some other exemplary embodiments, modulation may be performed according to some other constellation geometry and labelling. In this exemplary embodiment, the coded bits 201 are modulated onto a matrix $S \in \mathbb{C}^{N \times M}$ which is in the delay-Dopple domain. The matrix S is then passed on to the OTFS modulation unit 230. In the OTFS modulation unit, modulation is applied to the matrix S to obtain a time domain signal x(t). In this exemplary embodiment, the time domain signal x(t) is obtained in three steps. First, in unit 232, an inverse symplectic discrete Fourier transform, SDFT, which may be denoted by $SDFT^{-1}$, is performed. The $SDFT^{-1}$ may compute $$Z[n, m] = \frac{1}{\sqrt{NM}} \sum_{k=0}^{N-1} \sum_{l=1}^{M-1} S[k, l] e^{j2\pi\left(\frac{nk}{N} - \frac{ml}{M}\right)}$$

in which where $Z \in \mathbb{C}^{N \times M}$ is in the time-frequency domain. Next, in unit 234, transmission windowing may be performed. In this exemplary embodiment, the transmission windowing comprises windowing with weights $W_{TX} \in \mathbb{C}^{N \times M}$ that computes $Z \circ W_{TX}$, in which $\circ$ is an element-wise product. Then, a Heisenberg transform is performed by the unit 236. The Heisenberg transform computes the time domain signal $$x(t) = \sum_{n=0}^{N-1} \sum_{m=0}^{M-1} (Z \circ W_{TX})[n,m] g_{TX} (t-nT) e^{j2\pi m \Delta f(t-nT)},$$

in which $g_{TX}(t)$ is the transmit pulse shaping, for example $$rect\left(\frac{t}{T}\right),$$

and T and $\Delta f$ are intervals with which the time and frequency domain, respectively, are sampled.

Next, the time domain signal x(t) is transmitted to channel 240 from which is it received as signal y(t) by a demodulation unit 250 that in this exemplary embodiment is an OTFS demodulation unit comprised for example in a receiving unit of a device capable of connecting to a wireless network. The demodulation in this exemplary embodiment is performed in three steps. First, in unit 256, a Wigner transform is preformed to the received signal y(t) to apply a matched filter $g_{RX}(t)$. The Wigner transform is then followed by sampling to compute $\hat{Z} \in \mathbb{C}^{N \times M}$, which is in the time-frequency domain, $$\hat{Z}[n,m] = (\int g_{RX}*(t'-t)y(t')e^{-j2\pi(t'-t)}dt')|_{t=nT, f=m\Delta f}$$

in which the notation $|_{t=nT, f=m\Delta f}$ refers to the sample obtained for t=nT and f=m$\Delta$f.

Next, in unit 254, receiver windowing is performed. Receiver windowing comprises applying windowing with weights $W_{RX} \in \mathbb{C}^{N \times M}$, which computes $\hat{Z} \circ W_{RX}$. Then in unit 252 SDFT is applied to compute $\tilde{S} \in \mathbb{C}^{N \times M}$ in the delay-Doppler domain $$\tilde{S}[k, l] = \frac{1}{\sqrt{NM}} \sum_{k=0}^{N-1} \sum_{m=1}^{M-1} (\hat{Z} \circ W_{RX})[n, m] e^{-j2\pi\left(\frac{nk}{N} - \frac{ml}{M}\right)}.$$

After the demodulation, unit 260 performs equalization. In this exemplary embodiment, equalization is performed in the delay-Doppler domain. Estimation of a channel response in the delay-Doppler domain is denoted by $\hat{H} \in \mathbb{C}^{NM \times NM}$, such that $vec(\tilde{S}) = \hat{H} vec(S) + w$, in which vec( ) is a vectorization operator, that flattens a matrix into a vector, and $w \in \mathbb{C}^{NM}$ is a vector of Gaussian noise with variance $\sigma^2$ per element. Then, by leveraging LMMSE equalization, an estimate of S may be computed as $$\hat{S} = vec^{-1}(\hat{H}^H (\hat{H}\hat{H}^H + \sigma^2 I)^{-1} vec(\tilde{S}))$$

in which the superscript $^H$ denotes the conjugate transpose operator, and $vec^{-1}( )$ is the inverse vectorization operator.

The obtained equalized grid of symbols in the delay-Doppler domain $\hat{S}$ is then fed to a demapper unit 270. The demapper unit 270 in this exemplary embodiment comprises a demapper that is implemented using a NN with trainable weights $\theta$, that computes log-likelihood ratios, LLRs, for the coded bits B. Thus, LLRs are obtained.

After this, the computed LLRs are passed on to a decoding unit 280. In this exemplary embodiment, the decoding unit 280 comprises a decoding algorithm, such as belief propagation, BP, which reconstructs the information bits from the LLRs and the data that was originally transmitted, is received in the receiving unit.

Figure 2B:
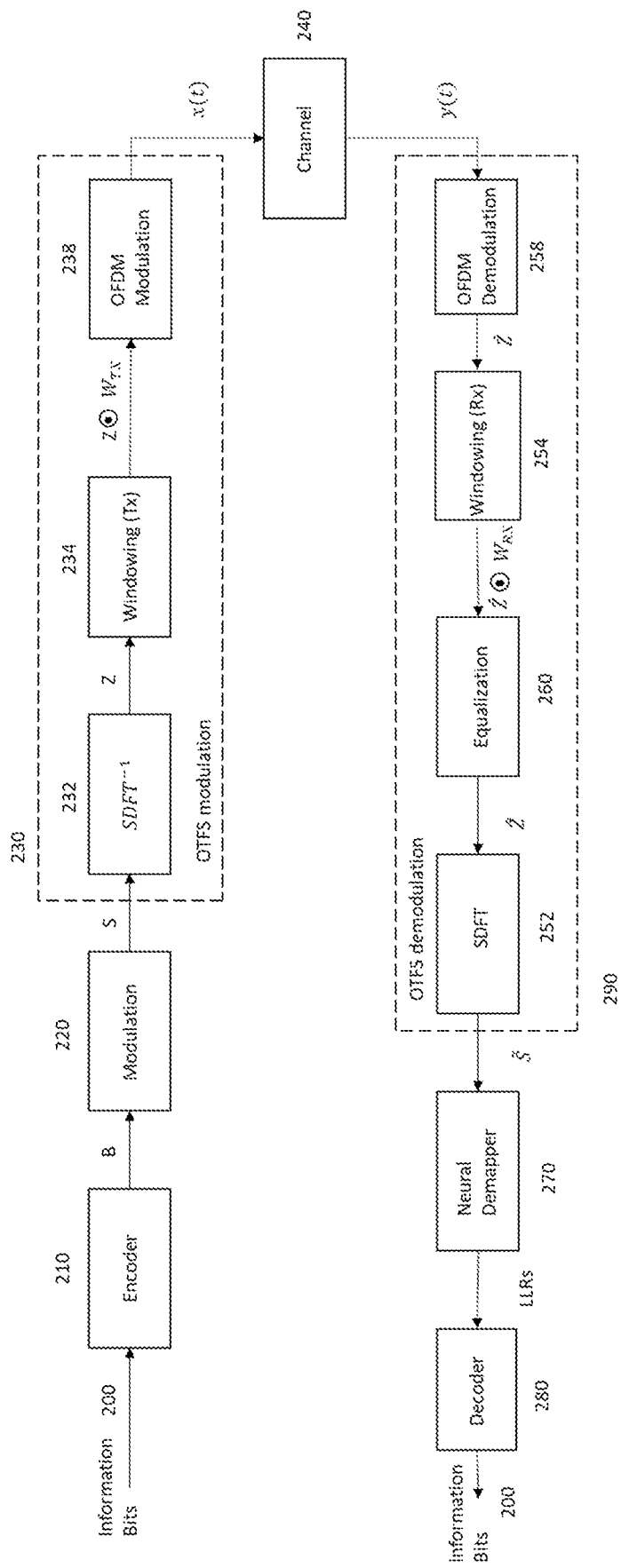

In some exemplary embodiments, OTFS may be used on top of OFDM. FIG. 2B illustrates an exemplary embodiment of using OTFS on top of OFDM, in other words, using OTFS together with OFDM. In such exemplary embodiments, the Heisenberg transform in step 3 of OTFS modulation 230, as illustrated in FIG. 2A, may be considered as a generalization of OFDM modulation, where OFDM corresponds to choosing $$g_{TX}(t) = rect\left(\frac{t}{T}\right).$$

Thus, in FIG. 2B there is an OFDM modulation unit 238 that determines the time domain signal instead of the Heisenberg transform unit 236. In this exemplary embodiment, N is the number of OFDM symbols, and M is the number of subcarriers. Moreover, adding a CP to each of the M subcarriers enables single-tap equalization in the time-frequency domain. Thus, the channel response in the time-frequency domain may be denoted as $\tilde{H} \in \mathbb{C}^{N \times M}$ and then equalization prior to the SDFT may be determined as follows:

$$\tilde{Z}[n, m] = \frac{\tilde{H}[n, m]^*}{|\tilde{H}[n, m]|^2 + \sigma^2} (\hat{Z} \circ W_{RX})[n, m].$$

SDFT may then be applied on $\tilde{Z}$. It is to be noted that such a single-tap equalization may not require any computationally demanding matrix inversion.

In the receiving unit then, in the exemplary embodiment illustrated in FIG. 2B, there is an OFDM demodulation unit 258 instead of a Wigner transform unit 256 as in FIG. 2A. Also, equalization is performed, by the equalization unit 260 before SDFT performed by the unit 252. Thus, there is an OTFS demodulation and equalization unit 290 in this exemplary embodiment. Otherwise, the units in the exemplary embodiment of FIG. 2B correspond to those of the exemplary embodiment FIG. 2A.

Figure 3:
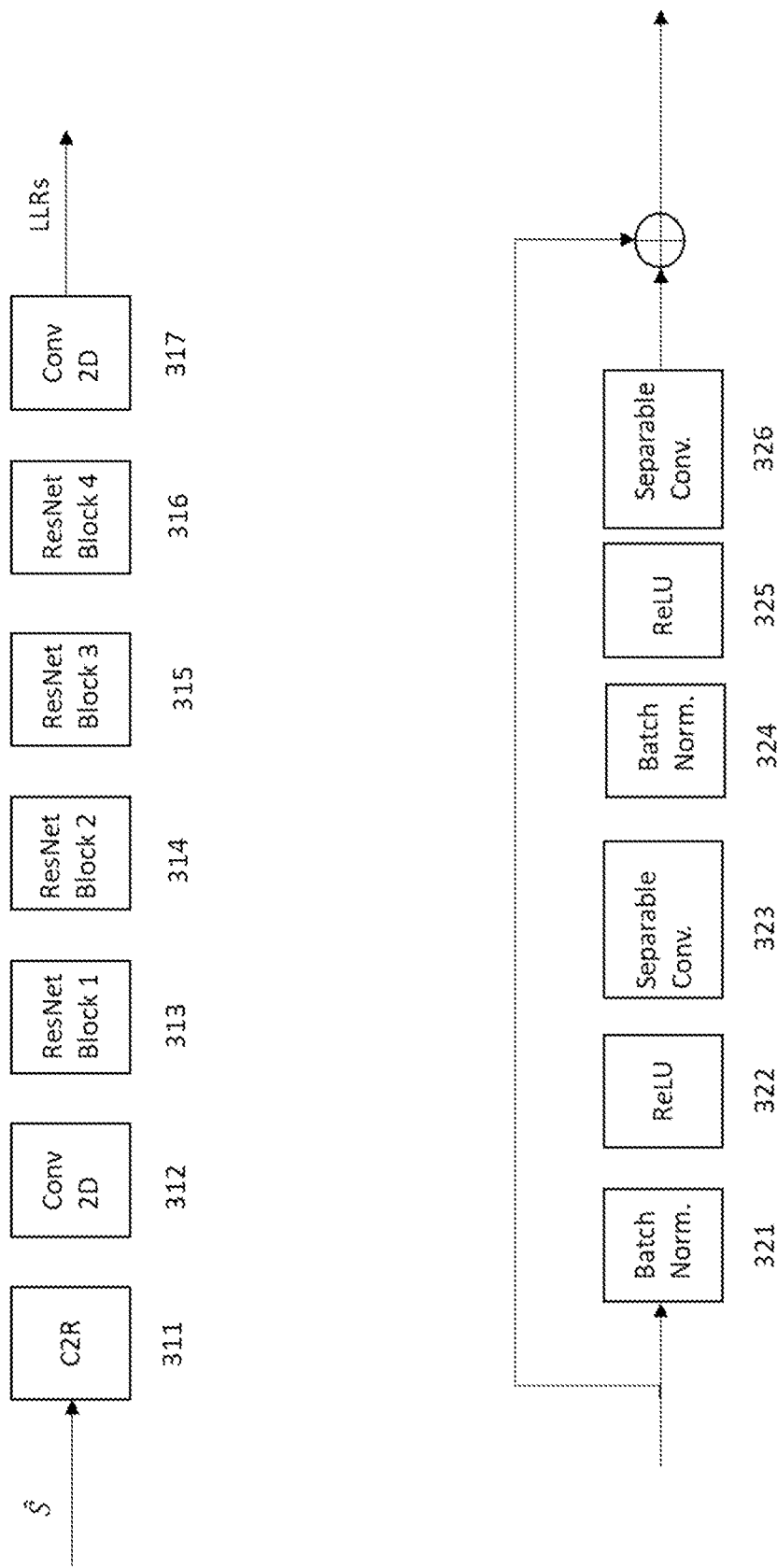
FIG. 3 illustrates an exemplary embodiment of an architecture for a demapper unit.

FIG. 3 illustrates an exemplary embodiment of an architecture for a demapper unit utilizing CNN, such as the demapper unit 270. The architecture illustrated is to be understood as a logical architecture the implementation of which may be done in any suitable manner. The obtained equalized grid of symbols in the delay-Doppler domain $\hat{S}$ is obtained as an input to the starting unit 311 that begins the demapping process performed by the demapper. Then the input is passed to 2D convolution layer 312. A 2D convolution layer, Cony 2D, may create a convolution kernel that is wind with layers input which may help to produce a tensor of outputs. Next, there are residual blocks, ResNet blocks, 313, 314, 315 and 316. Although there are four ResNet blocks illustrated in this exemplary embodiment, there could also be another amount of ResNet blocks. A residual block may be understood as activation of a layer that is forwarded to a deeper layer in the neural network. Then there is another Cony 2D 317 before the LLRs are obtained as an output. The LLRs may then be fed to a batch normalization unit 321 after which a rectifier linear unit, ReLu, 322 is applied and then separable convolution 324 is performed. This procedure is then repeated as there are also batch normalization 324, ReLu 325 and separable convolution 326.

As the input of the CNN in this exemplary embodiment is 2 dimensional, a 2D CNN architecture is adopted. Also, as is illustrated, a residual network is leveraged to avoid vanishing gradients in this exemplary embodiment. If the number of bits per symbol is denoted by K, the output of the neural demapper is of dimension N×M×K.

In this exemplary embodiment, training of the CNN used by the demapper is one on a total binary cross-entropy $$L := \frac{1}{MN} \sum_{n=1}^{N} \sum_{m=1}^{M} \sum_{k=1}^{K} \mathbb{E}\{-\log_2 \hat{P}(B[n, m, k] \mid \hat{S}, \theta, W_{TX}, W_{RX})\}$$

which can be rewritten as $$L = K - \frac{1}{MN} \sum_{n=1}^{N} \sum_{m=1}^{M} \sum_{k=1}^{K} [I(B[n, m, k]; \hat{S} \mid W_{TX}) +$$

$$\mathbb{E}_{\hat{S}}\{D_{KL}(\hat{P}(B[n, m, k] \mid \hat{S}, \theta, W_{TX}, W_{RX}) \mid P(B[n, m, k] \mid \hat{S}, W_{TX}))\}]$$

in which B[n, m, k] is the $k^{th}$ bit of the RE (n, m), I(B[n, m, k]; $\hat{S}|W_{TX}$) is the mutual information between the received equalized signal $\hat{S}$ and the bit B[n, m, k] conditioned on the transmitter windowing parameters $W_{TX}$, $\hat{P}$(B[n, m, k]| $\hat{S}$, $\theta$, $W_{TX}$, $W_{RX}$) is the posterior distribution estimated by the neural receiver on the bit B[n, m, k] conditioned on the received signal $\hat{S}$, the neural receiver parameters $\theta$, and the transmitter and receiver windowing parameters $W_{TX}$ and $W_{RX}$, P(B[n, m, k]| $\hat{S}$, $W_{TX}$) is the true posterior distribution on the bit B[n, m, k] conditioned on the received equalized signal $\hat{S}$ and transmitter windowing parameters $W_{TX}$, and $D_{KL}(\cdot|\cdot)$ is the Kullback-Leibler, KL, divergence. Because I(B [n, m, k]; $\hat{S}|W_{TX}$) does not depend on the demapper parameters $\theta$, one can see that by minimizing L, one actually optimizes the neural demapper such that it approximates closely the optimal true posterior distribution I(B[n, m, k]; $\hat{S}|W_{TX}$).

It is to be noted that the inversion of the matrix ($\hat{H}\hat{H}^H$+ $\sigma^2$I) may be computationally demanding, for example if NM is large. Therefore, equalization in the time-frequency domain, i.e., prior to the SDFT, may be performed which may then help to reduce the computational cost involved in LMMSE equalization. For example, if OTFS is applied on top of OFDM, a single-tap equalization may be performed in the time-frequency domain, as we will see later.

It is also to be noted that OTFS modulation and demodulation each involve a windowing operation with weights $W_{TX}$ and $W_{RX}$, respectively. Thus, in some exemplary embodiments, the weights may be optimized jointly with the neural demapper parameters $\theta$. By training on the total binary cross-entropy the end-to-end system may be trained to maximize an achievable information rate for practical bit-interleaved coded modulation, BICM, systems. In other words, the windowing parameters $W_{TX}$ and $W_{RX}$ are jointly optimized with the neural demapper parameters $\theta$ in order to maximize an achievable information rate for practical systems.

Figure 4:
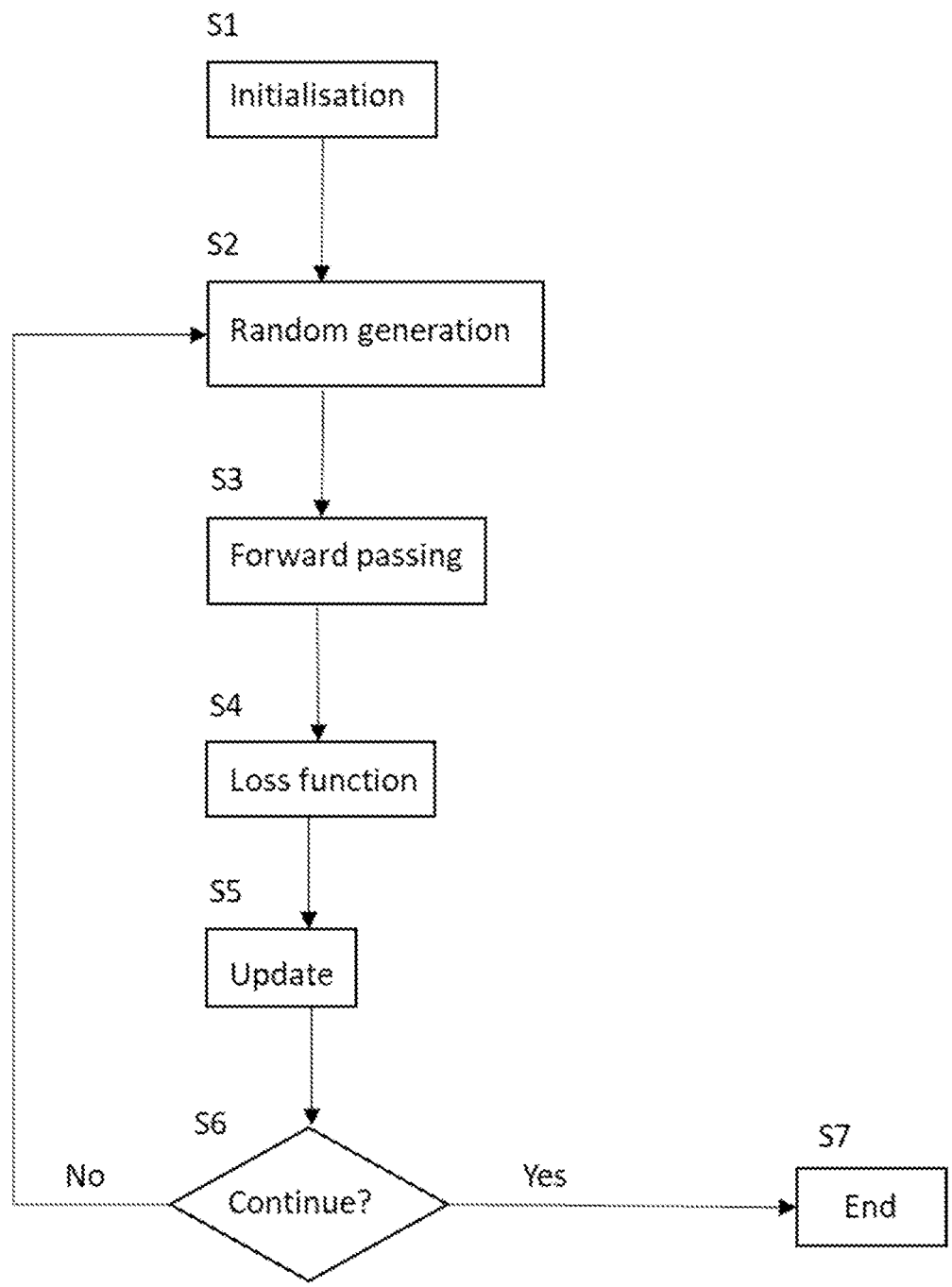
FIG. 4 illustrates an exemplary embodiment of training an end-to-end system.

FIG. 4 illustrates an exemplary embodiment of training an end-to-end system such as those described above. The training procedure optimizes $\theta$. This optimization may be performed jointly with $W_{TX}$ and $W_{RX}$ in an end-to-end manner. When optimizing the transmitter windowing parameters $W_{TX}$, the procedure in this exemplary embodiment assumes that the channel model is differentiable with respect to the input.

First, in S1, $\theta$ is initialized randomly. Optionally also $W_{TX}$ and $W_{RX}$ are randomly initialized. Next, in S2, U tensors of bits with dimensions M×N×K ($B^{(1)}, \ldots, B^{(U)}$) are randomly generated as well as corresponding matrices of symbols ($S^{(1)}, \ldots, S^{(U)}$) in which U is the batch size. Then, in S3, one forward pass is performed in the end-to-end system for each batch example after which is S4 a total binary cross-entropy is estimated using the equation $$\hat{L} = -\frac{1}{MNU} \sum_{u=1}^{U} \sum_{m=1}^{M} \sum_{n=1}^{N} \sum_{k=1}^{K} \left( B^{(u)}[n, m, k]\log\left(\hat{P}\left(B^{(u)}[n, m, k] = 1 \mid \hat{S}^{(u)}\right)\right) + \right.$$

$$\left. (1 - B^{(u)}[n, m, k])\log\left(1 - \hat{P}\left(B^{(u)}[n, m, k] = 1 \mid \hat{S}^{(u)}\right)\right)\right)$$

In S5 then the gradient of $\hat{L}$ relative to $\theta$ is determined. Optionally, also $W_{TX}$ and $W_{RX}$ may be determined. One step of stochastic gradient descent, SGD, may also be applied. In S6 it is then determined if a pre-determined stop criterion is applies, and if it does, then the training ends in S7. If the pre-determined training criterion does not apply, then the training continues from S2 onwards.

It is to be noted that the stop criterion at S6 may take multiple forms, such as stop after a predefined number of iterations or when the loss function has not decreased for a predefined number of iterations. The learning rate, batch size U, and possibly other parameters of the SGD variant may be considered as optimization hyperparameters.

Figure 5:
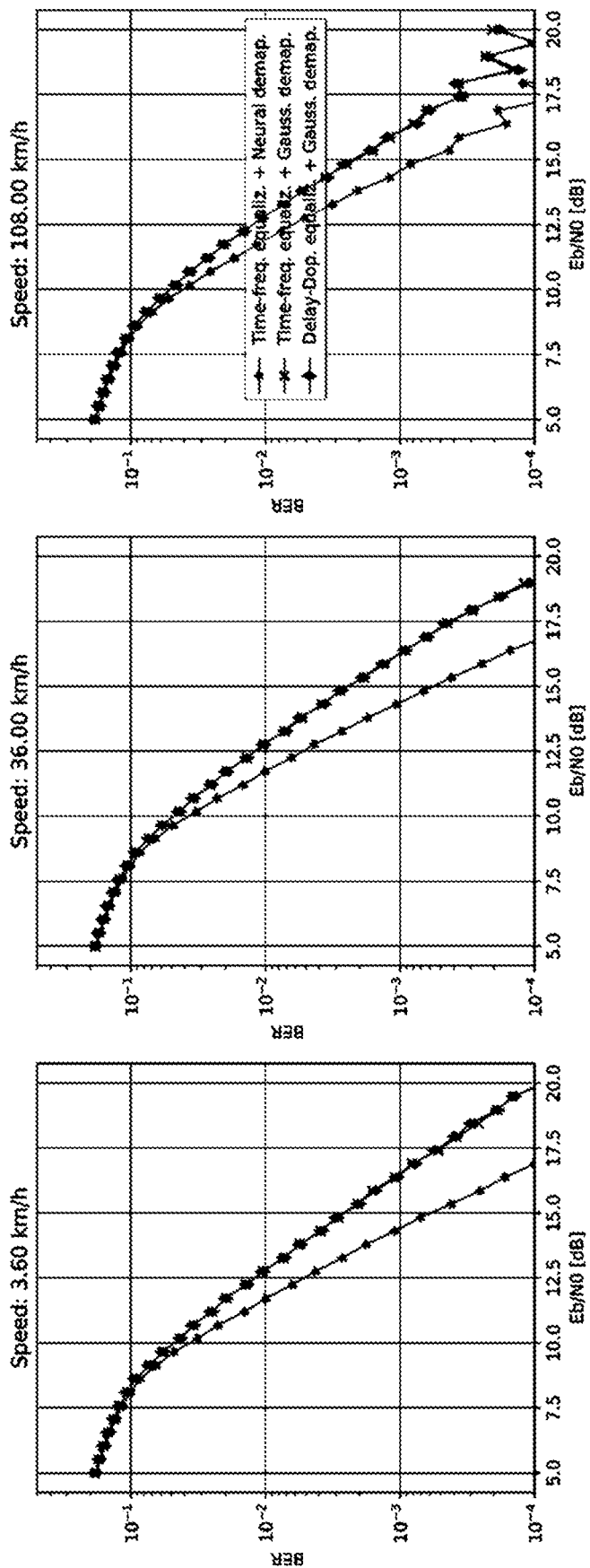
FIG. 5 illustrates simulation results of an exemplary embodiment.

FIG. 5 illustrates simulation results of exemplary embodiments in which a demapper using machine learning such as described above, is utilized. In the simulation results the gains enabled by a neural demapper in an OTFS system were compared to linear equalization in time-frequency domain followed by Gaussian demapping, and to linear equalization in delay-Doppler domain followed by Gaussian demapping. 3GPP 38.901 UMi LoS and NLoS models were considered, and a 5G NR LDPC code with a length of 1024 bits and a rate of ⅔ was leveraged. The frequency carrier was set to 3.5 GHz, and the sub carrier spacing to 30 kHz. In these exemplary embodiments, OTFS was running on top of OFDM, to facilitate equalization in the time-frequency domain. The used modulation was 16-QAM. Also, BERs achieved by the different systems are illustrated. As is illustrated, when using a Gaussian demapper, time-frequency equalization achieves the same BERs as equalization in the delay-Doppler domain. Therefore, because of its low complexity, time-frequency equalization was used as pre-processing for the neural demapper. As is illustrated, it achieves significant gains over a Gaussian demapper, for all the considered velocities.

Figure 6:
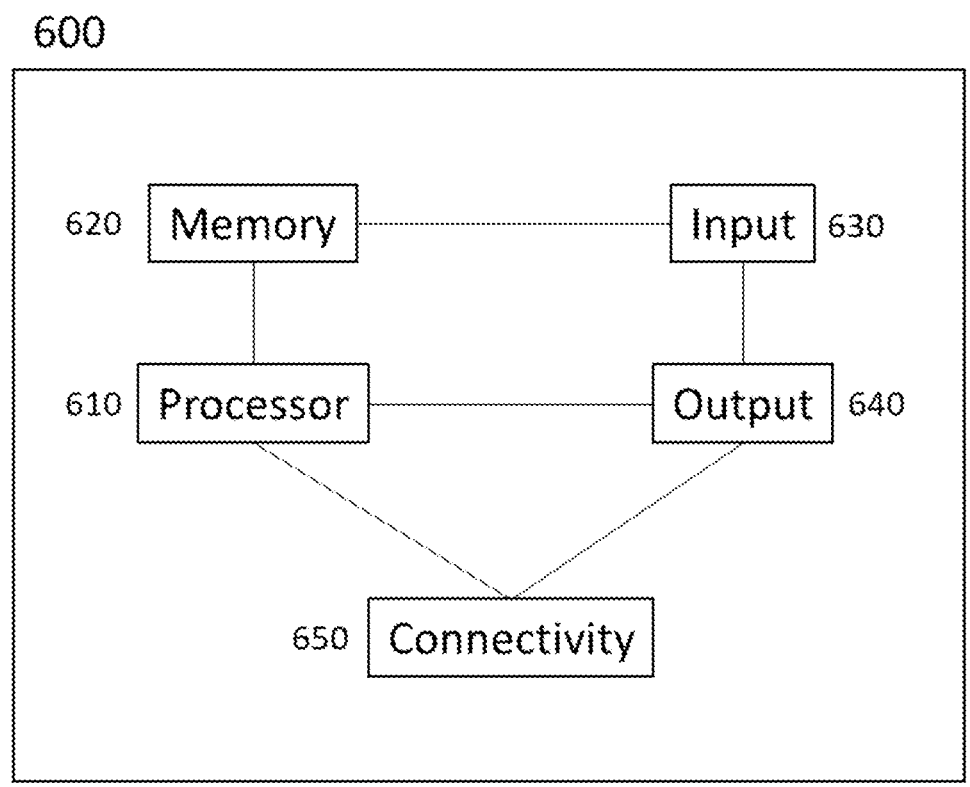
FIG. 6 illustrates an exemplary embodiment of an apparatus.

FIG. 6 illustrates an exemplary embodiment of an apparatus that may be comprised in, or connected to, a device that is capable of connecting to a wireless network. A receiving and/or transmitting unit as described above, may be comprised in the device as well. The apparatus 600 comprises a processor 610. The processor 610 interprets computer program instructions and process data. The processor 610 may comprise one or more programmable processors. The processor 610 may comprise programmable hardware with embedded firmware and may, alternatively or additionally, comprise one or more application specific integrated circuits, ASICs.

The processor 610 is coupled to a memory 620. The processor is configured to read and write data to and from the memory 620. The memory 620 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 620 stores computer readable instructions that are execute by the processor 610. For example, non-volatile memory stores the computer readable instructions and the processor 610 executes the instructions using volatile memory for temporary storage of data and/or instructions.

The computer readable instructions may have been pre-stored to the memory 620 or, alternatively or additionally, they may be received, by the apparatus, via electromagnetic carrier signal and/or may be copied from a physical entity such as computer program product. Execution of the computer readable instructions causes the apparatus 600 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 600 further comprises, or is connected to, an input unit 630. The input unit 630 comprises one or more interfaces for receiving a user input. The apparatus 600 also comprises an output unit 640. The apparatus 600 may further comprise a connectivity unit 650. The connectivity unit 650 enables wired and/or wireless connectivity to external networks. The connectivity unit 650 may comprise one or more antennas and one or more receivers that may be integrated to the apparatus 600 or the apparatus 600 may be connected to. The connectivity unit 650 may comprise an integrated circuit or a set of integrated circuits that provide the wireless communication capability for the apparatus 600. Alternatively, the wireless connectivity may be a hardwired application specific integrated circuit, ASIC.

It is to be noted that the apparatus 600 may further comprise various component not illustrated in the FIG. 6. The various components may be hardware component and/or software components.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
at least one processor, and
at least one memory including a computer program code, wherein the at least one memory and the computer program code are configured, with the at least one processor, to cause the apparatus to:
receive a modulated radio signal transmitting coded information bits;
perform demodulating on the modulated radio signal, wherein demodulating comprises performing orthogonal time frequency space demodulation;
perform equalization on the demodulated radio signal to obtain equalized symbols;
obtain log-likelihood ratios for the coded information bits from the equalized symbols using a trained machine learning model;
reconstruct the coded information bits; and
wherein the machine learning model is trained jointly with transmitter windowing optimizing and receiver windowing optimizing, wherein the transmitter window optimizing and receiver window optimizing comprises optimizing transmitter windowing parameter and receiver windowing parameter.

2. The apparatus according to claim 1, wherein equalization is performed in delay-Doppler domain.

3. The apparatus according to claim 1, wherein the trained machine learning model is a convolutional neural network.

4. The apparatus according to claim 3, wherein the convolutional neural network is two dimensional.

5. The apparatus according to claim 3, wherein the convolutional neural network leverages residual blocks.

6. The apparatus according to claim 1, wherein the trained machine learning model is trained to approximate an optimal maximum a-posteriori distribution.

7. The apparatus according to claim 1, wherein demodulating the modulated radio signal comprises performing orthogonal frequency-division multiplexing.

8. The apparatus according to claim 1, wherein reconstructing the coded information bits comprises using a belief propagation decoding algorithm.

9. A method, comprising:
receiving a modulated radio signal transmitting coded information bits;
performing demodulating on the modulated radio signal, wherein demodulating comprises performing orthogonal time frequency space demodulation;
performing equalization on the demodulated radio signal to obtain equalized symbols;
obtaining log-likelihood ratios for the coded information bits from the equalized symbols using a trained machine learning model; and
reconstructing the coded information bits,
wherein the machine learning model is trained jointly with transmitter windowing optimizing and receiver windowing optimizing, wherein the transmitter window optimizing and receiver window optimizing comprises optimizing transmitter windowing parameter and receiver windowing parameter.

10. The method according to claim 9, wherein the trained machine learning model is a convolutional neural network.

11. The method according to claim 9, wherein the trained machine learning model is trained to approximate an optimal maximum a-posteriori distribution.

12. The method according to claim 11, wherein demodulating the modulated radio signal comprises performing orthogonal frequency-division multiplexing.

13. A computer program embodied on a non-transitory computer readable medium, said computer program comprising program instructions for causing an apparatus to perform at least:
- receiving a modulated radio signal transmitting coded information bits;
- performing demodulating on the modulated radio signal, wherein demodulating comprises performing orthogonal time frequency space demodulation;
- performing equalization on the demodulated radio signal to obtain equalized symbols;
- obtaining log-likelihood ratios for the coded information bits from the equalized symbols using a trained machine learning model; and
- reconstructing the coded information bits,
- wherein the machine learning model is trained jointly with transmitter windowing optimizing and receiver windowing optimizing, wherein the transmitter window optimizing and receiver window optimizing comprises optimizing transmitter windowing parameter and receiver windowing parameter.

* * * * *